(12) United States Patent
Ryu

(10) Patent No.: US 9,496,089 B2
(45) Date of Patent: Nov. 15, 2016

(54) POWER CONNECTING APPARATUS FOR VEHICLE

(71) Applicant: Hyundai Motor Company, Seoul (KR)

(72) Inventor: Byeong Yeol Ryu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 235 days.

(21) Appl. No.: 14/329,101

(22) Filed: Jul. 11, 2014

(65) Prior Publication Data

US 2015/0179344 A1   Jun. 25, 2015

(30) Foreign Application Priority Data

Dec. 23, 2013   (KR) .................... 10-2013-0161442

(51) Int. Cl.
 *H01G 4/35* (2006.01)
 *H01G 4/01* (2006.01)

(52) U.S. Cl.
 CPC . *H01G 4/35* (2013.01); *H01G 4/01* (2013.01)

(58) Field of Classification Search
 CPC .................................. H01G 4/35; H01G 4/01
 See application file for complete search history.

(56) References Cited

U.S. PATENT DOCUMENTS

| | | | | |
|---|---|---|---|---|
| 2,123,050 A | * | 7/1938 | Johnson | H01G 5/06 334/6 |
| 3,729,728 A | * | 4/1973 | Hardway, Jr. | D06F 39/005 324/166 |
| 5,210,682 A | * | 5/1993 | Takashima | G06F 13/409 174/260 |
| 6,018,322 A | | 1/2000 | Taniguchi et al. | |
| 7,391,374 B2 | | 6/2008 | Inatsugu et al. | |
| 8,681,506 B2 | * | 3/2014 | Nakai | B62D 5/0406 174/261 |
| 8,982,570 B2 | * | 3/2015 | Toyama | H01B 7/0081 361/748 |

FOREIGN PATENT DOCUMENTS

KR   10-0535390   12/2005

* cited by examiner

*Primary Examiner* — David M Sinclair
(74) *Attorney, Agent, or Firm* — Mintz Levin Cohn Ferris Glovsky and Popeo, P.C.; Peter F. Corless

(57) ABSTRACT

A power connecting apparatus for a vehicle is provided to prevent noise generated from one electric device from interfering with other electrical devices. The apparatus includes a power plate that includes a common power portion configured to receive power from a battery, a plurality of individual power portions radially disposed around the common power portion and separated from each other, and a power connecting portion that connects the common power portion and the individual power portions. A ground plate includes a common ground portion grounded to a vehicle body, a plurality of individual ground portions radially disposed around the common ground portion and separated from each other, and a ground connecting portion that connects the common ground portion and the individual ground portions. In addition, a dielectric material plate is disposed between the power plate and the ground plate.

8 Claims, 8 Drawing Sheets

POWER CONNECTING APPARATUS FOR VEHICLE

CROSS-REFERENCE TO RELATED APPLICATION

This application claims priority to and the benefit of Korean Patent Application No. 10-2013-0161442 filed in the Korean Intellectual Property Office on Dec. 23, 2013, the entire contents of which are incorporated herein by reference.

BACKGROUND (a) Field of the Invention

The present invention relates to a power connecting apparatus for a vehicle. More particularly, the present invention relates to a power connecting apparatus for a vehicle for preventing interference caused by noise generated from various electrical devices disposed within a vehicle.

(b) Description of the Related Art

Generally, a plurality of electrical devices are disposed within a vehicle. Power supplied to the plurality of electrical devices is supplied from a battery disposed within the vehicle and the plurality of electrical devices are connected through a common ground line to prevent noise generated from one of the plurality of electrical devices from electrically affecting the other electrical devices.

FIGS. 1A and 1B are exemplary views illustrating a power connecting apparatus of a vehicle according to prior art. FIG. 2 is an exemplary view illustrating interference generated by common power or common ground of electrical devices for a vehicle according to prior art. As shown in FIGS. 1A-1B, ground lines connected to a plurality of electrical devices provided in a vehicle are connected through one common ground line. In other words, the ground line 10 provided in each electrical device is electrically connected to one common ground line 20 to prevent electrical interference from various electrical devices.

However, since the vehicle may not be properly grounded, the ground of the vehicle may not be stable compared to general electric home appliances or equipment. Therefore, electrical devices disposed within the vehicle are fundamentally weak to noise, and noise generated from one of the electrical devices affects the other electrical devices. As shown in FIG. 2, since an electrical device 'A' and an electrical device 'B' are electrically connected to each other via a common power line or a common ground line, noise generated from one of the electrical devices interferes freely with the other electrical device. Accordingly, system performance of the vehicle may be degraded or functional errors may occur.

The above information disclosed in this section is merely for enhancement of understanding of the background of the invention and therefore it may contain information that does not form the prior art that is already known in this country to a person of ordinary skill in the art.

SUMMARY

The present invention provides a power connecting apparatus for vehicle that prevents interference of noise generated from one of electrical devices to the other electrical devices.

A power connecting apparatus for a vehicle according to an exemplary embodiment of the present invention may include: a power plate that has a common power portion configured to receive power from a battery, a plurality of individual power portions radially disposed around the common power portion and separated from each other, and a power connecting portion that connects the common power portion and the individual power portions; a ground plate that has a common ground portion grounded to a vehicle body, a plurality of individual ground portions radially disposed around the common ground portion and separated from each other, and a ground connecting portion that connects the common ground portion and the individual ground portions; and a dielectric material plate disposed between the power plate and the ground plate.

A width of the power connecting portion may correspond to an amount of current received from the individual power portion. The common ground portion may be grounded to the vehicle body via a ground pin. The ground pin may be electrically connected to a ground line of the battery. An insulation plate may be disposed between the individual ground portion and the vehicle body.

A plurality of power connecting apparatuses for vehicle according to another exemplary embodiment of the present invention may further include: a power plate that has a common power portion configured to receive power from a battery, a plurality of individual power portions radially disposed and separated from each other around the common power portion, and a power connecting portion that connects the common power portion and the individual power portions; a ground plate that has a common ground portion grounded to a vehicle body, a plurality of individual ground portions radially disposed around the common ground portion and separated from each other, and a ground connecting portion that connects the common ground portion and the individual ground portions; and a dielectric material plate disposed between the power plate and the ground plate, wherein each of the common power portions of the plurality of power plates is connected in parallel to a power line of the battery, and each of the common ground portions of the plurality of ground plates is connected in parallel to a ground line of the battery.

A width of the power connecting portion may correspond to an amount of current received from individual power portions. The common ground portion may be grounded to the vehicle body via a ground pin. The ground pin may be electrically connected to a ground line of the battery. An insulation plate may be disposed between the individual ground portions and the vehicle body.

DETAILED DESCRIPTION

Figure 1A:
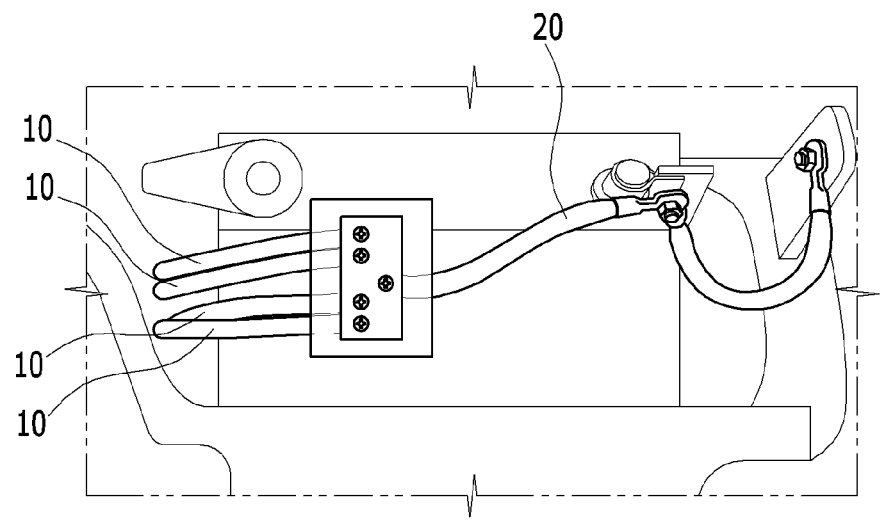
FIGS. 1A and 1B are exemplary views illustrating a power connecting apparatus of a vehicle according to the related art.
Figure 1B:
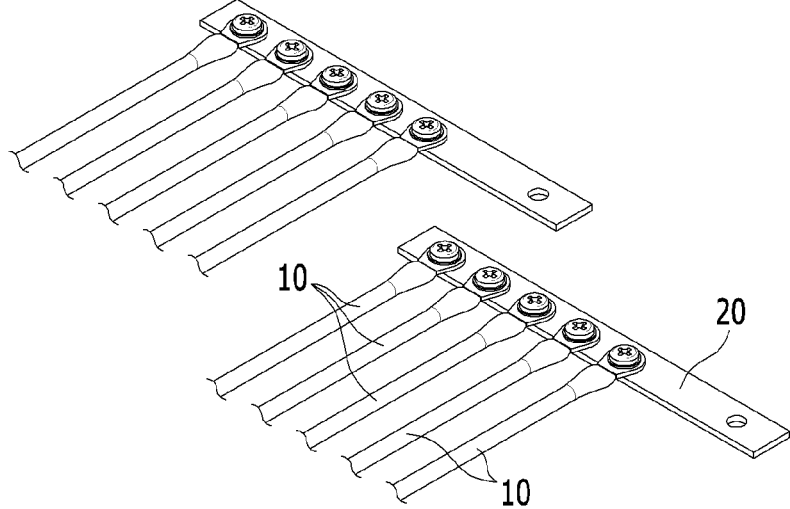
Figure 2:
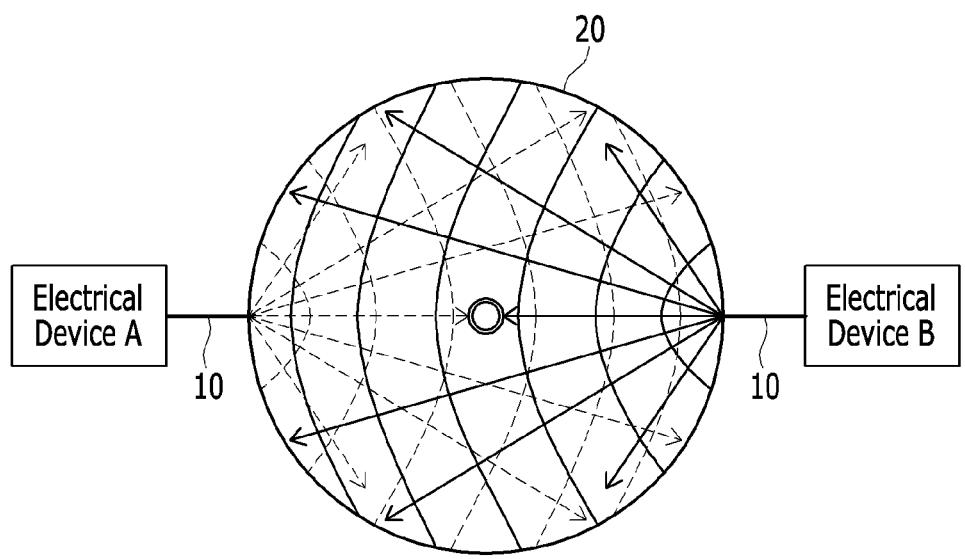
FIG. 2 is an exemplary view illustrating interference generated by common power or common ground of electrical devices for a vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. In describing the present invention, parts that are not related to the description will be omitted. Like reference numerals generally designate like elements throughout the specification. In addition, the size and thickness of each configuration shown in the drawings are arbitrarily shown for better understanding and ease of description, but the present invention is not limited thereto. In the drawings, the thicknesses of layers, films, panels, regions, etc., are exaggerated for clarity.

Figure 3:
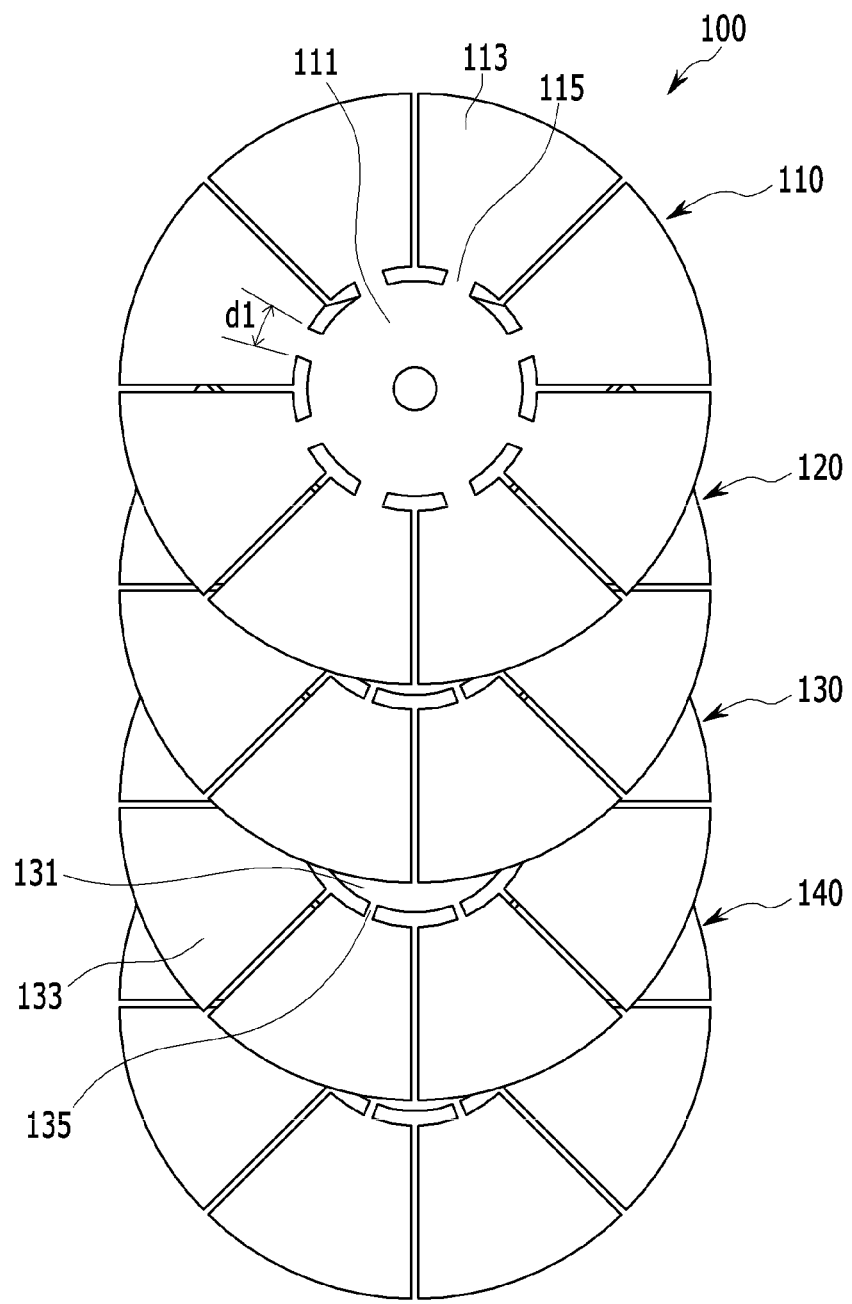
FIG. 3 is an exemplary detailed view illustrating a power connecting apparatus for a vehicle according to an exemplary embodiment of the present invention.
Figure 4:
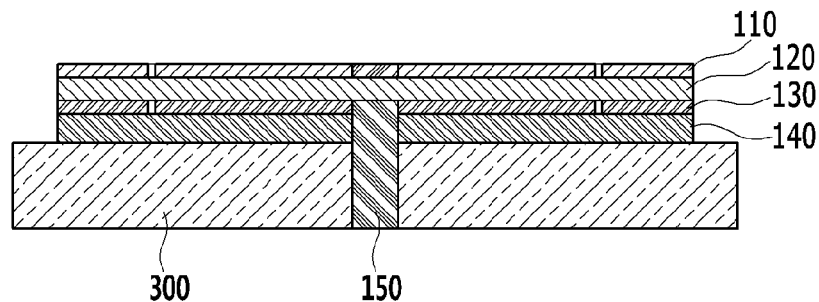
FIG. 4 is an exemplary side view illustrating a power connecting apparatus for a vehicle according to an exemplary embodiment of the present invention.
Figure 5:
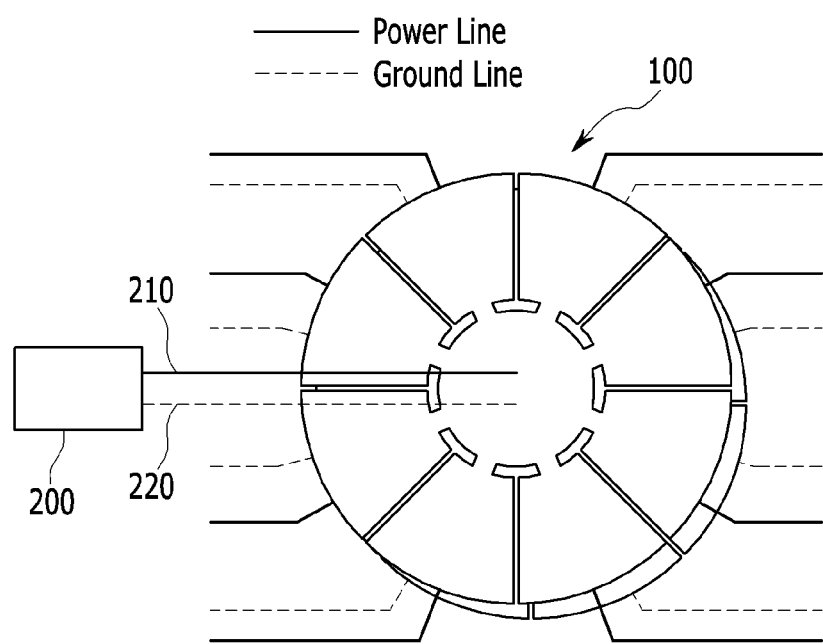
FIG. 5 is an exemplary view illustrating a power line and a ground line of electrical devices connected to a power connecting apparatus for a vehicle according to an exemplary embodiment of the present invention.

FIG. 3 is an exemplary detailed view illustrating a power connecting apparatus for a vehicle according to an exemplary embodiment of the present invention. FIG. 4 is an exemplary side view illustrating a power connecting apparatus for a vehicle according to an exemplary embodiment of the present invention. FIG. 5 is an exemplary view illustrating a power line and a ground line of electrical devices connected to a power connecting apparatus for a vehicle according to an exemplary embodiment of the present invention.

As shown in FIG. 3 to FIG. 5, a power connecting apparatus 100 for a vehicle according to an exemplary embodiment of the present invention may include a ground plate 130 grounded to a vehicle body 300, a power plate 110 disposed at an upper side of the ground plate 130 and configured to receive power from a battery 200, and a dielectric material plate 120 disposed between the ground plate 130 and the power plate 110.

The power plate 110 may include a common power portion 111 configured to receive power from the battery 200, a plurality of individual power portions 113 radially disposed around the common power portion 111 and separated from each other, and a power connecting portion 115 that connects the common power portion 111 and the individual power portion 113. The individual power portion 113 may be electrically connected to a power line 210 of an electrical device disposed within the vehicle and configured to supply power to each electrical device. A width of the power connecting portion 115 (d1) may be formed with a size that corresponds to an amount of current received from the individual power portion 113. In other words, when the amount of current supplied to the electrical device is substantially high (e.g., above a predetermined level), the width of the power connecting portion 115 (d1) may be formed more widely. When an amount of current supplied to the electrical device is substantially low (e.g., below a predetermined level), the width of the power connecting portion 115 (d1) may be formed more narrowly. The size of the common power portion 111 may be formed at a maximum size. As the size of the common power portion 111 increases, the electrical device becomes stronger to interference by electrical noise (e.g., the electrical devices may become more resistant to electrical noise interference).

In an exemplary embodiment of the present invention, the power plate 110 may be formed with the plurality of individual power portions 113 radially disposed around the common power portion 111 formed in a substantially circular shape and separated from each other. However, the present invention is not necessarily limited thereto, and the common power portion 111 may be formed in a polygonal shape or a different shape. Additionally, the ground plate 130 may include a common ground portion 131 electrically connected to the vehicle body 300 and grounded, a plurality of individual ground portions 133 radially disposed around the common ground portion 131 and separated from each other, and a ground connecting portion 135 that connects the common ground portion 131 and the individual ground portion 133.

The common ground portion 131 may be fixed and grounded to the vehicle body 300 via a ground pin 150, and the ground pin 150 may be electrically connected to a ground line of the battery 200. The individual ground portions 133 may be electrically connected to a ground line 220 of the electrical device disposed within the vehicle to ground the electrical device. In an exemplary embodiment of the present invention, the ground plate 130 may be formed with the plurality of individual ground portions 133 radially disposed around the common ground portion 131 formed in a substantially circular shape and are separated each other. However, the present invention is not necessarily limited thereto, and the common ground portion 131 may be formed in a polygonal shape or different shape.

Moreover, an insulation plate 140 may be disposed between the ground plate 130 and the vehicle body 300. The common ground portion 131 may be grounded to the vehicle body 300 via the ground pin 150, and the individual ground portions 133 and the vehicle body 300 may be insulated by the insulation plate 140. Therefore, it may be possible to minimize noise generated from the vehicle body 300 from diffusing to each electrical device grounded via the individual ground portion 133.

Figure 6:
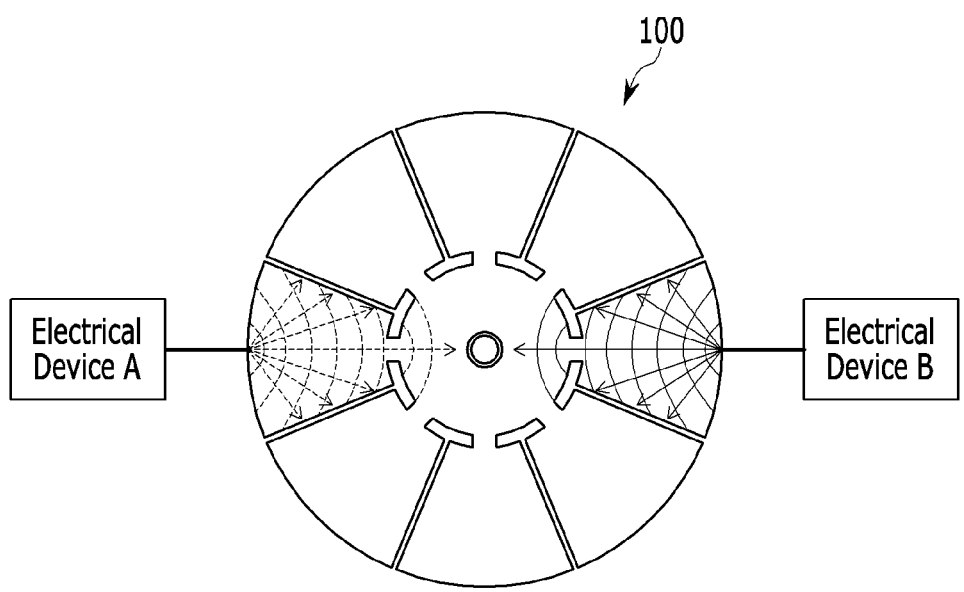
FIG. 6 is an exemplary view illustrating a process of blocking noise by a power connecting apparatus for a vehicle according to an exemplary embodiment of the present invention.

FIG. 6 is an exemplary view illustrating a process of blocking noise by a power connecting apparatus for a vehicle according to an exemplary embodiment of the present invention. As shown in FIG. 6, since the electrical devices electrically connected to the individual power portion 113 may be radially disposed around the common power portion 111 and may be configured to receive power via the power connecting portion 115, it may be possible to minimize the power source noise generated from one of the electrical devices from interfering with the other electrical devices. Further, since the electrical device electrically connected to the individual ground portion 133 may be radially disposed around the common ground portion 131 and may be grounded via the ground connecting portion 135, it may be possible to minimize the power source noise generated from one of the electrical devices interfering with the other electrical devices.

Figure 7:
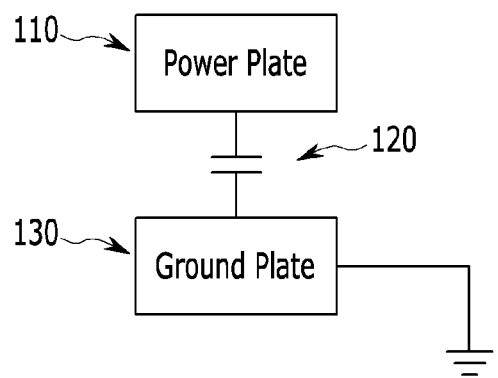
FIG. 7 is an exemplary equivalent circuit diagram illustrating a power connecting apparatus for a vehicle according to an exemplary embodiment of the present invention.

FIG. 7 is an exemplary equivalent circuit diagram illustrating a power connecting apparatus for a vehicle according to an exemplary embodiment of the present invention. As shown in FIG. 7, since the dielectric material plate 120 may be disposed between the power plate 110 and the ground plate 130 formed of a conducting material, the dielectric material plate 120 may electrically operate as a capacitor. Therefore, an electric potential between the individual power portion 113 and the individual ground portion 133 may be uniformly maintained. Further, noise generated by the electrical device may be reduced by the capacitor formed of the dielectric material plate 120.

Figure 8:
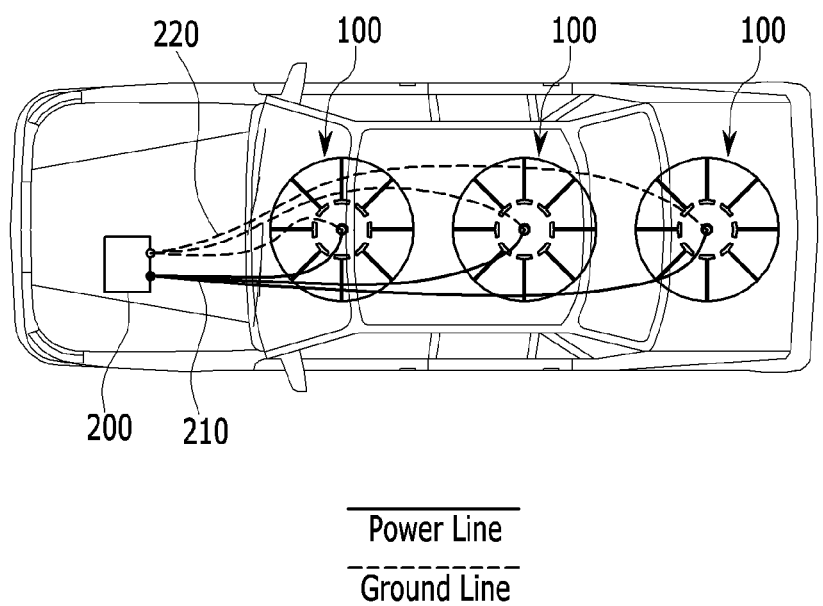
FIG. 8 is an exemplary view illustrating a method for connecting a plurality of power connecting apparatuses for a vehicle according to an exemplary embodiment of the present invention.

FIG. 8 is an exemplary view illustrating a method for connecting a plurality of power connecting apparatuses for a vehicle according to an exemplary embodiment of the present invention. As shown in FIG. 8, when a plurality of power connecting apparatuses for a vehicle are disposed within the vehicle, each of the common power portions 111 of the plurality of power plates 110 may be electrically connected in parallel to a power terminal of the battery 200 and the common ground portions 131 of the plurality of ground plates 130 may be electrically connected in parallel to a ground terminal of the battery 200.

As such, since the plurality of common power portions 111 and the plurality of common ground portions 131 may be connected in parallel to the power terminal and the ground terminal of the battery 200, electric potential of a plurality of power connecting apparatus disposed within the vehicle may be uniformly maintained. When one of the common power portions 111 is electrically connected in series to the other common power portion 111 or one of the common ground portions 131 is electrically connected in series to another common ground portion 131, an electric potential difference between the plurality of the power plates 110 and the ground plates 130 may occur. Therefore, an electric potential difference of power supplied to each of the electrical devices may occur, and thus causing the electric potential of the electrical device to not be maintained uniformly (e.g., be non-uniformly maintained).

Accordingly, in an exemplary embodiment of the present invention, the plurality of common power portions 111 and the plurality of common ground portions 131 may be connected in parallel to the power terminal and the ground terminal of the battery 200. According to an exemplary embodiment of the present invention, an individual power portion and an individual ground portion may be disposed radially around a common power portion and a common ground portion, to prevent noise generated from one of electrical devices from interfering with the other electrical devices. Further, a dielectric material plate disposed between a power plate and a ground plate may operate as a capacitor to eliminate noise generated from the power line.

DESCRIPTION OF SYMBOLS

110: power plate
111: common power portion
113: individual power portion
115: power connecting portion
120: dielectric material plate
130: ground plate
131: common ground portion
133: individual ground portion
135: ground connecting portion
140: insulation plate
200: battery
210: power line
220: ground line While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

What is claimed is:

1. A power connecting apparatus for a vehicle, comprising:
    a power plate that includes a common power portion configured to receive power from a battery, a plurality of individual power portions radially disposed around the common power portion and separated from each other, and a power connecting portion that connects the common power portion and the individual power portions;
    a ground plate that includes a common ground portion grounded to a vehicle body, a plurality of individual ground portions radially disposed around the common ground portion and separated from each other, and a ground connecting portion that connects the common ground portion and the individual ground portions; and
    a dielectric material plate disposed between the power plate and the ground plate,
    wherein the common ground portion is grounded to the vehicle body via a ground pin located at a center of the ground plate.

2. The power connecting apparatus for a vehicle of claim 1, wherein a width of the power connecting portion corresponds to an amount of current received from the individual power portion.

3. The power connecting apparatus for a vehicle of claim 1, wherein the ground pin is electrically connected to a ground line of the battery.

4. The power connecting apparatus for a vehicle of claim 1, wherein an insulation plate is disposed between the ground plate and the vehicle body.

5. A plurality of power connecting apparatuses for a vehicle, comprising:
    each of the power connecting apparatuses comprising:
        a power plate that includes a common power portion configured to receive power from a battery, a plurality of individual power portions radially disposed and separated from each other around the common power portion, and a power connecting portion that connects the common power portion and the individual power portions;
a ground plate that includes a common ground portion grounded to a vehicle body, a plurality of individual ground portions radially disposed around the common ground portion and separated from each other, and a ground connecting portion that connects the common ground portion and the individual ground portions; and
a dielectric material plate disposed between the power plate and the ground plate,
wherein each of the common power portions of the plurality of power plates is connected in parallel to a power line of the battery,
each of the common ground portions of the plurality of ground plates is connected in parallel to a ground line of the battery, and
the common ground portion is grounded to the vehicle body via a ground pin located at a center of the ground plate of each of the power connecting apparatuses, respectively.

6. The plurality of power connecting apparatuses for a vehicle of claim 5, wherein a width of the power connecting portion corresponds to an amount of current received from the individual power portions of the power plate of one of the power connecting apparatuses.

7. The plurality of power connecting apparatuses for a vehicle of claim 5, wherein the ground pin is electrically connected to the ground line of the battery.

8. The plurality of power connecting apparatuses for a vehicle of claim 5, wherein an insulation plate is disposed between the ground plate and the vehicle body of each of the power connecting apparatuses.

* * * * *